United States Patent
Shiraki

(10) Patent No.: US 12,416,596 B2
(45) Date of Patent: Sep. 16, 2025

(54) MOISTURE ABSORBING SENSOR, RFID TAG, AND MOISTURE ABSORPTION AMOUNT MEASUREMENT SYSTEM

(71) Applicant: Murata Manufacturing Co., Ltd., Nagaokakyo (JP)

(72) Inventor: Hiroshi Shiraki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 369 days.

(21) Appl. No.: 17/976,975

(22) Filed: Oct. 31, 2022

(65) Prior Publication Data

US 2023/0051698 A1 Feb. 16, 2023

Related U.S. Application Data

(63) Continuation of application No. PCT/JP2021/019939, filed on May 26, 2021.

(30) Foreign Application Priority Data

Jun. 25, 2020 (JP) ................................ 2020-109397

(51) Int. Cl.
  *G01N 27/22* (2006.01)
  *G06K 19/077* (2006.01)
(52) U.S. Cl.
  CPC ......... *G01N 27/225* (2013.01); *G01N 27/228* (2013.01); *G06K 19/07775* (2013.01)
(58) Field of Classification Search
  USPC ....................................................... 324/664
  See application file for complete search history.

(56) References Cited

U.S. PATENT DOCUMENTS

| | | |
|---|---|---|
| 2004/0254306 A1 | 12/2004 | Isogai et al. |
| 2007/0210807 A1 | 9/2007 | Arisaka |
| 2008/0012580 A1 | 1/2008 | Funo et al. |
| 2015/0032274 A1 | 1/2015 | Runge et al. |
| 2016/0084911 A1* | 3/2016 | Mensah-Brown ... G01R 31/392 324/426 |
| 2018/0188310 A1* | 7/2018 | Koeppendoerfer .... G01R 31/58 |
| 2021/0109053 A1 | 4/2021 | Shiraki |

FOREIGN PATENT DOCUMENTS

| | | |
|---|---|---|
| CN | 1889138 A | 1/2007 |
| JP | S54-107797 A | 8/1979 |
| JP | 2005003543 A | 1/2005 |
| JP | 2007248065 A | 9/2007 |

(Continued)

OTHER PUBLICATIONS

International Search Report in PCT/JP2021/019939, mailed Aug. 17, 2021, 3 pages.

*Primary Examiner* — Farhana A Hoque
(74) *Attorney, Agent, or Firm* — ArentFox Schiff LLP

(57) ABSTRACT

A moisture absorbing sensor is provided that includes a hygroscopic material that maintains a shape before and after moisture absorption and maintains a hygroscopic state for a predetermined time or more after moisture absorption; and an electrode disposed in the hygroscopic material. Moreover, an electrical characteristic of a circuit formed by the electrode and the hygroscopic material changes according to a moisture absorption amount of the hygroscopic material.

17 Claims, 12 Drawing Sheets

(56) References Cited

FOREIGN PATENT DOCUMENTS

| | | | |
|---|---|---|---|
| JP | 2007333484 | A | 12/2007 |
| JP | 2009036526 | A | 2/2009 |
| JP | 2012145384 | A | 8/2012 |
| JP | 2015137936 | A | 7/2015 |
| JP | 2017124796 | A | 7/2017 |
| JP | 2018-128428 | A | 8/2018 |
| WO | 2020008935 | A1 | 1/2020 |

* cited by examiner

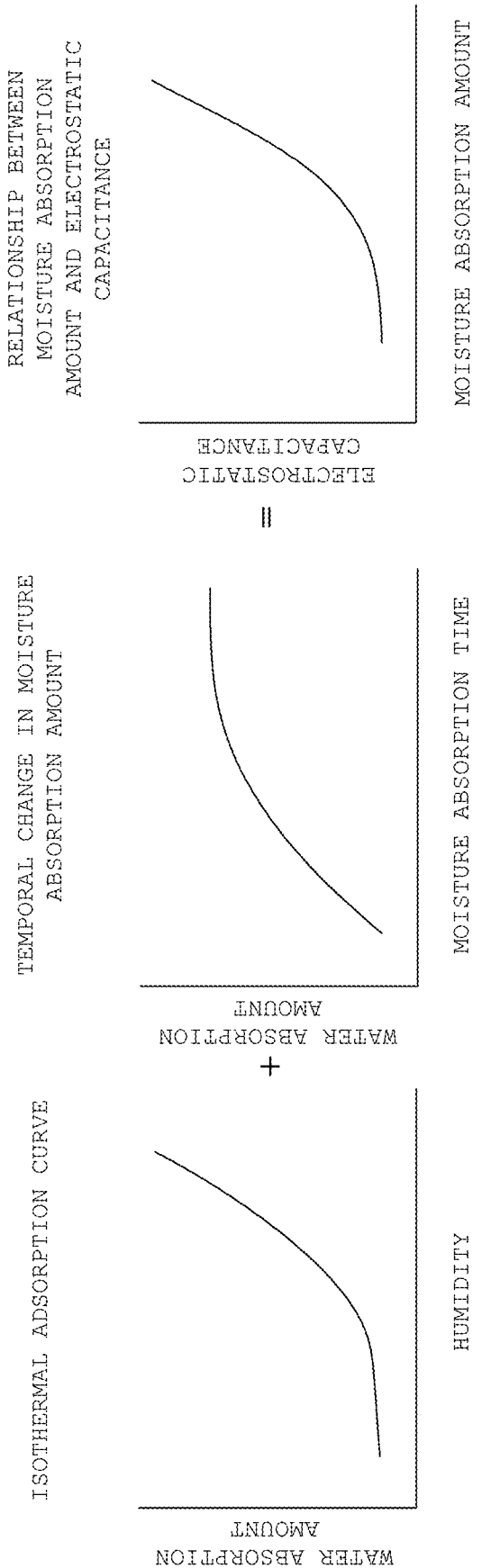

MOISTURE ABSORBING SENSOR, RFID TAG, AND MOISTURE ABSORPTION AMOUNT MEASUREMENT SYSTEM

CROSS REFERENCE TO RELATED APPLICATIONS

This application is a continuation of PCT Application No. PCT/JP2021/019939, filed May 26, 2021, which claims priority to Japanese Patent Application No. 2020-109397, filed Jun. 25, 2020, the entire contents of each of which are hereby incorporated by reference in their entirety.

TECHNICAL FIELD

The present invention relates to a moisture absorbing sensor, an RFID tag including the moisture absorbing sensor, and a moisture absorption amount measurement system.

BACKGROUND

Conventionally, a method of monitoring a temporal change in humidity using a humidity sensor when an article sensitive to humidity in the atmosphere is stored or transported is known. The conventional method includes a general humidity sensor, a circuit that operates the humidity sensor, and a device for recording and analyzing information. However, this conventional method requires a complicated system and is costly. Moreover, when a battery is used as a power source, it is necessary to periodically replace the battery.

Thus, a humidity indicator that does not use a power source is known. The humidity indicator is obtained by impregnating paper with a material whose color changes depending on humidity. The humidity indicator can know a humidity state by changing the color. However, the humidity indicator needs to visually confirm a color state. Therefore, the humidity indicator is difficult to perform confirmation operation when the number of articles to be measured increases.

Thus, for example, Patent Documents 1 and 2 (identified below) propose an RFID tag using a material whose electrical characteristics, such as electric resistance and electrostatic capacitance, change depending on humidity.

In particular, Japanese Patent Application Laid-Open No. 2009-36526 (hereinafter "Patent Document 1") discloses that exposure to a certain level or more of environment for a certain period of time or more is detected by utilizing the fact that interface resistance between aluminum and aluminum oxide irreversibly changes due to environment, temperature, humidity, or atmospheric gas.

In addition, Japanese Patent Application Laid-Open No. 2007-333484 (hereinafter "Patent Document 2") discloses that a deliquescent material, such as calcium chloride, is used for a moisture sensitive material. The deliquescent material of Patent Document 2 becomes a liquid state when an environmental humidity becomes equal to or higher than a certain level. Therefore, the electrical characteristics of a circuit containing the deliquescent material change. In the configuration of Patent Document 2, whether the environmental humidity is equal to or higher than a certain threshold value can be measured by measuring the change in the electrical characteristics.

Since the configuration of Patent Document 1 detects a change in environment according to a degree of oxidation, when it is desired to detect whether humidity exceeds a certain threshold, the threshold cannot be freely set.

Moreover, the moisture sensitive material of Patent Document 2 cannot maintain its shape after moisture absorption. Thus, a material for absorbing the moisture sensitive material liquefied is separately required. In addition, the configuration of Patent Document 2 also does not allow the threshold of humidity desired to be detected to be freely set.

SUMMARY OF THE INVENTION

Thus, the exemplary embodiments of the present invention provide a humidity sensor and a moisture absorption amount measurement system configured to freely set a threshold of humidity desired to be detected.

In an exemplary aspect, a moisture absorbing sensor is provided that includes a hygroscopic material configured to maintain a shape before and after moisture absorption and to also maintain a hygroscopic state for a predetermined time or more after moisture absorption. The moisture absorbing sensor also includes an electrode disposed in the hygroscopic material. An electrical characteristic of a circuit formed by the electrode and the hygroscopic material changes according to a moisture absorption amount of the hygroscopic material.

Since the hygroscopic material maintains a shape before and after moisture absorption, it is not necessary to separately provide a material for absorbing the hygroscopic material as described in Patent Document 2. In addition, since the shape of the hygroscopic material is maintained, an amount of change in electrical characteristics with respect to the moisture absorption amount can be easily controlled by changing the thickness, the type of material, or the like. Therefore, the moisture absorbing sensor of the exemplary aspects of the present invention can freely set a threshold of humidity desired to be detected. Maintaining a shape means maintaining a solid state, and is included in the concept of maintaining the shape when there is a change in volume due to moisture absorption.

According to the exemplary aspects of the present invention, a desired threshold of humidity to be detected can be freely and easily set.

BRIEF DESCRIPTION OF DRAWINGS

FIG. 7 is a view showing a relationship between a moisture absorption amount and various conditions.

DETAILED DESCRIPTION

Figure 1A:
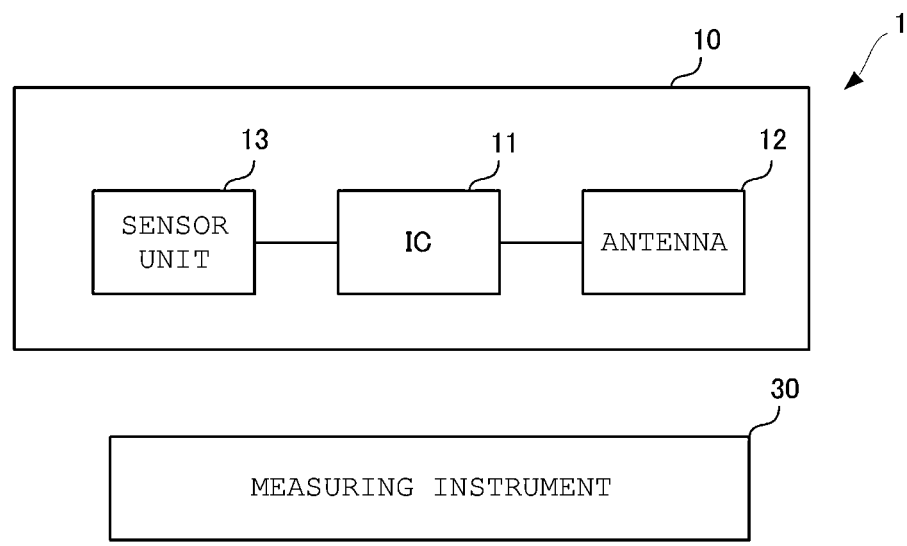
FIG. 1(A) is a block diagram showing a configuration of a moisture absorption amount measurement system 1.
Figure 1B:
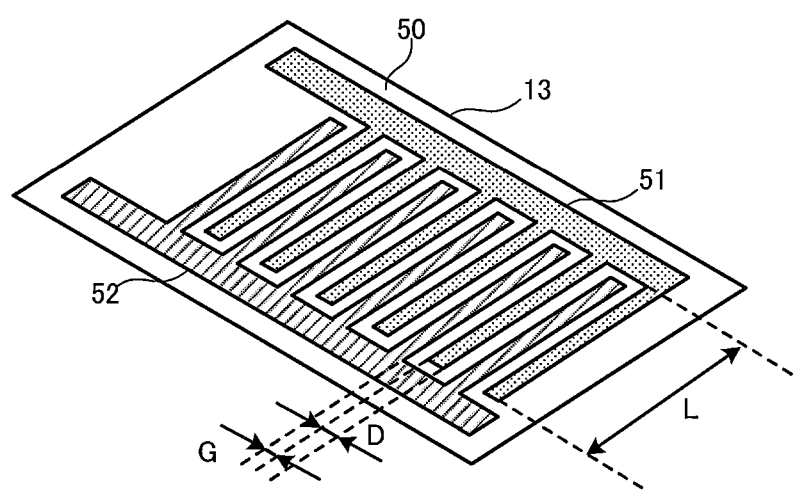
FIG. 1(B) is a partial external perspective view of a sensor unit 13 in an RFID tag 10.

FIG. 1(A) is a block diagram showing a configuration of a moisture absorption amount measurement system 1, and FIG. 1(B) is an external perspective view of a sensor unit 13 in an RFID tag 10.

As shown, the moisture absorption amount measurement system 1 includes the RFID tag 10 and a measuring instrument 30. The RFID tag 10 includes an IC 11, an antenna 12, and the sensor unit 13. The IC 11, the antenna 12, and the sensor unit 13 are arranged on a substrate, such as a PET film (not shown), according to an exemplary aspect. Moreover, the RFID tag 10 is attached to an article, a box for packing the article, or the like.

In the exemplary aspect, the measuring instrument 30 is an RFID reader that includes an antenna (not shown) and communicates (e.g., wirelessly) with the RFID tag 10.

The IC 11 of the RFID tag 10 receives power from the measuring instrument 30 via the antenna 12 and communicates with the measuring instrument 30. The IC 11 is connected to the sensor unit 13. In accordance with an instruction from the measuring instrument 30, the IC 11 reads information indicating electrical characteristics of the sensor unit 13 and transmits the read information to the measuring instrument 30.

As shown in FIG. 1(B), the sensor unit 13 includes a hygroscopic material 50, and a first electrode 51 and a second electrode 52 arranged on the hygroscopic material 50.

The first electrode 51 and the second electrode 52 are arranged in a comb shape according to an exemplary aspect. As an example, the first electrode and the second electrode 52 are formed by arranging six thin electrodes each having a width D of 50 μm. Moreover, a gap G between the electrodes is 50 μm and a length L of the electrode is 1 mm. It is noted that the number, width, gap, and length of the electrodes are not limited to this example. In addition, the structure of the electrode is not limited to the comb-shaped structure, and may be any structure as long as electrostatic capacitance is generated.

In the exemplary aspect, the hygroscopic material 50 is formed of, for example, a superabsorbent material of an acrylic acid polymer partial sodium salt crosslinked product. Moreover, the hygroscopic material 50 absorbs moisture in the air and holds the moisture for a long time. The thickness of the hygroscopic material 50 is, for example, 0.71 mm. A dielectric constant of the hygroscopic material 50 changes according to an amount of absorbed moisture (i.e., a moisture absorption amount). Therefore, the electrical characteristics of a circuit formed by the hygroscopic material 50, the first electrode 51, and the second electrode 52 change depending on the moisture absorption amount of the hygroscopic material 50. In particular, in the example of FIG. 1(B), since the first electrode 51 and the second electrode 52 are arranged in a comb shape, the electrostatic capacitance changes depending on the moisture absorption amount of the hygroscopic material 50.

In operation, the measuring instrument 30 is configured to estimate the moisture absorption amount of the hygroscopic material 50 by measuring the change in electrostatic capacitance. As a result, the moisture absorption amount measurement system 1 can detect whether or not an article to which the RFID tag 10 is attached is exposed under a humidity environment exceeding a specific (e.g., a predetermined) threshold. Hereinafter, the exemplary aspects of the present invention will be specifically described.

First, a case where the superabsorbent material is used for the hygroscopic material 50 will be described. The superabsorbent material uses an acrylic acid polymer partial sodium salt crosslinked product. In the hygroscopic material 50 of the superabsorbent material, in order to bond particles of the superabsorbent material to each other and a raw material paste of the hygroscopic material 50 to the substrate, a binder was added in an amount of 3% by weight to the superabsorbent material. The superabsorbent material, the binder, and a solvent (e.g., Ekinen) were mixed to prepare a raw material paste.

Each of the first electrode 51 and the second electrode 52 shown in FIG. 1(B) is formed of a silver paste printed on a PET film. The silver paste is dried at 130° C. for 10 minutes. The raw material paste is applied onto the dried first electrode 51 and second electrode 52. The raw material paste is further dried at 130° C. for 10 minutes. Thus, the sensor unit 13 is produced.

The sensor unit 13 was left standing for 24 hours in a thermo-hygrostat (e.g., SH-641 manufactured by ESPEC CORP.) set at 25° C. and 50% RH. This state is referred to as an initial state before moisture absorption.

Thereafter, the sensor unit 13 in the initial state is stored at 70% RH or 90% RH for 1 hour or 24 hours in the same type of thermo-hygrostat as described above. Thus, the sensor unit 13 absorbs moisture.

Figure 2:
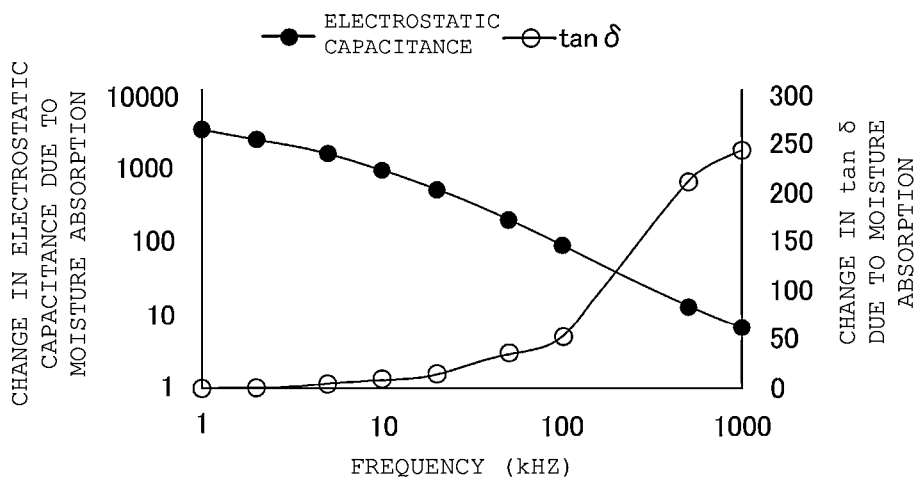
FIG. 2 is a graph showing a delay (tan δ) in electrostatic capacitance and current phase when moisture is absorbed at 90% RH for 24 hours when a superabsorbent material is used as a hygroscopic material 50.

FIG. 2 is a graph showing a delay (tan δ) in electrostatic capacitance and current phase when moisture is absorbed at 90% RH for 24 hours. The electrostatic capacitance was measured with an LCR meter (e.g., E4980A manufactured by Keysight Technologies). A measurement frequency is 1 KHz to 1 MHz. The change in electrostatic capacitance (hereinafter referred to as sensitivity) shown in FIG. 2 is a value obtained by dividing the electrostatic capacitance value after moisture absorption by the electrostatic capacitance value before moisture absorption.

As shown in FIG. 2, the lower the frequency, the higher the sensitivity. Such frequency characteristics correspond to dispersion behavior due to orientation polarization of water. The change in electrostatic capacitance due to moisture absorption indicates that the change is caused by moisture absorption of water in the air by the hygroscopic material 50.

Figure 3:
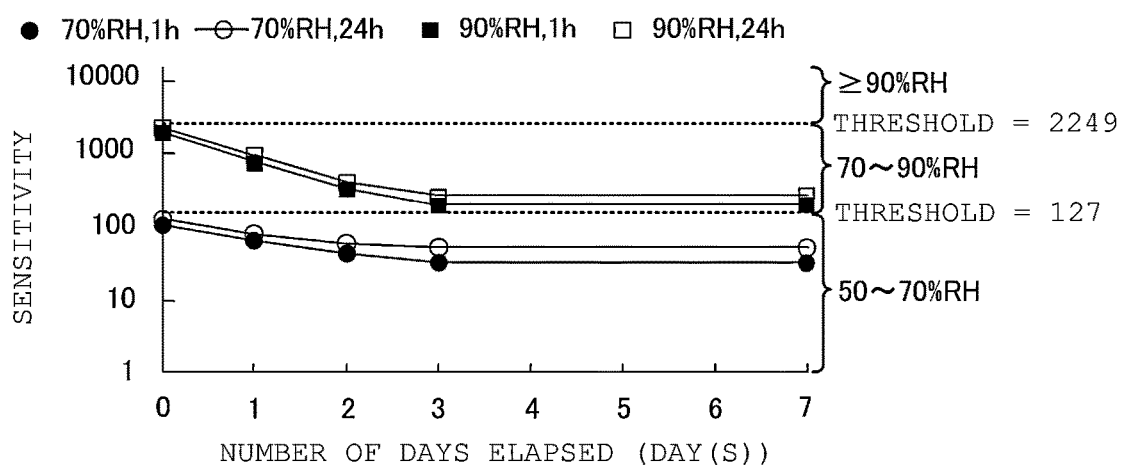
FIG. 3 is a graph showing changes in electrostatic capacitance on a moisture absorption treatment day (0 day after moisture absorption treatment), and 1 day, 2 days, 3 days, and 7 days after the moisture absorption treatment when the superabsorbent material is used as the hygroscopic material 50.

FIG. 3 is a graph showing changes in electrostatic capacitance on a moisture absorption treatment day (0 day after moisture absorption treatment), and 1 day, 2 days, 3 days, and 7 days after the moisture absorption treatment when the superabsorbent material is used as the hygroscopic material 50. The frequency characteristics shown in FIG. 2 have the highest sensitivity at 1 KHz, and thus all the sensitivities described below are values of 1 KHz.

As shown in FIG. 3, the sensitivity is 1 or more under all hygroscopic conditions. Therefore, it can be seen that the electrostatic capacitance of the sensor unit 13 increases due to moisture absorption. In addition, the sensitivity is higher when moisture is absorbed at 90% RH than when moisture is absorbed at 70% RH, regardless of whether a moisture absorption time is 1 hour or 24 hours, until at least 7 days later.

From these results, in the measuring instrument 30, for example, when a threshold is set to sensitivities of 127 and 2249, it is found that the humidity is maintained in a range of 50 to 70% RH when the sensitivity is in a range of 1 to 127, it is found that the humidity is maintained in a range of 70 to 90% RH when the sensitivity is in a range of 127 to 2249, and it is found that the humidity is 90% RH or more when the sensitivity is 2249 or more after the passage of at least 7 days.

Next, an example in which the hygroscopic material 50 is hyaluronic acid will be described. As the hyaluronic acid, sodium carboxymethyl hyaluronate is used. Since the hyaluronic acid has a binder function, the hyaluronic acid can be brought into close contact with a substrate without using an additional binder. The raw material paste is obtained by dissolving hyaluronic acid in water. In the same manner as described above, the raw material paste is applied onto the first electrode 51 and the second electrode 52. The raw material paste is dried at 130° C. for 30 minutes. The initial state is the same as described above, and is a state of being left standing for 24 hours in a thermo-hygrostat (e.g., SH-641 manufactured by ESPEC CORP.) set at 25° C. and 50% RH.

Figure 4A:
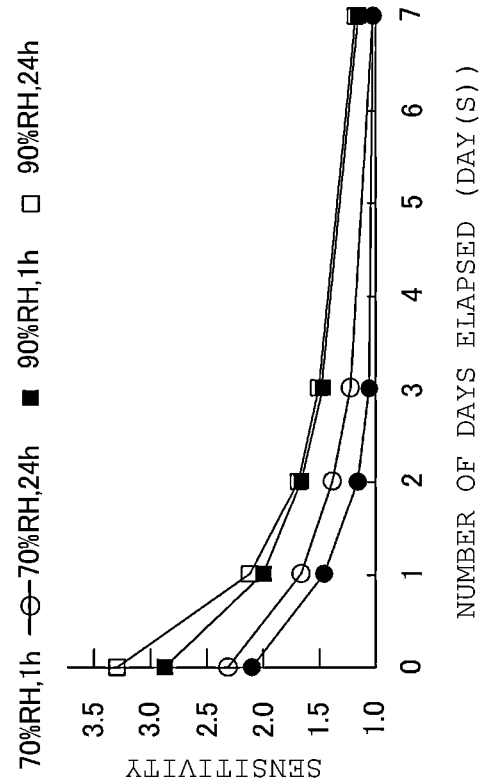
FIGS. 4(A) and 4(B) are each graphs showing the changes in electrostatic capacitance on the moisture absorption treatment day (0 day after moisture absorption treatment), and 1 day, 2 days, 3 days, and 7 days after the moisture absorption treatment when hyaluronic acid and polyoctanium are used as the hygroscopic material 50.

FIG. 4(A) is a graph showing changes in electrostatic capacitance on the moisture absorption treatment day (0 day after moisture absorption treatment), and 1 day, 2 days, 3 days, and 7 days after the moisture absorption treatment when hyaluronic acid is used as the hygroscopic material 50.

As shown in FIG. 4(A), the hygroscopic material 50 of hyaluronic acid has a sensitivity of 1 or more under all hygroscopic conditions. Therefore, the electrostatic capacitance of the hygroscopic material 50 of hyaluronic acid increases due to moisture absorption.

The hygroscopic material 50 of hyaluronic acid has different sensitivities at 70% RH and 90% RH until two days have elapsed. Furthermore, the hygroscopic material 50 of hyaluronic acid has higher sensitivity as it absorbs moisture at high humidity for a long time. Thus, in the measuring instrument 30, for example, when the threshold is set to sensitivities of 3.0 and 3.8, it is found that on the moisture absorption treatment day, the humidity is maintained in the range of 50 to 70% RH when the sensitivity is in a range of 1.0 to 3.0, the humidity is maintained in the range of 70 to 90% RH when the sensitivity is in a range of 3.0 to 3.8, and the humidity is 90% RH or more when the sensitivity is 3.8 or more.

An example in which the hygroscopic material 50 is polyoctanium will be described. Polyoctanium-51 is used as polyoctanium. In general, since polyoctanium also has the binder function, no additional binder is required. The raw material paste is obtained by dissolving polyoctanium in water. In the same manner as described above, the raw material paste is applied onto the first electrode 51 and the second electrode 52. The raw material paste is dried at 130° C. for 30 minutes. The initial state is the same as described above, and is a state of being left standing for 24 hours in a thermo-hygrostat (e.g., SH-641 manufactured by ESPEC CORP.) set at 25° C. and 50% RH.

Figure 4B:
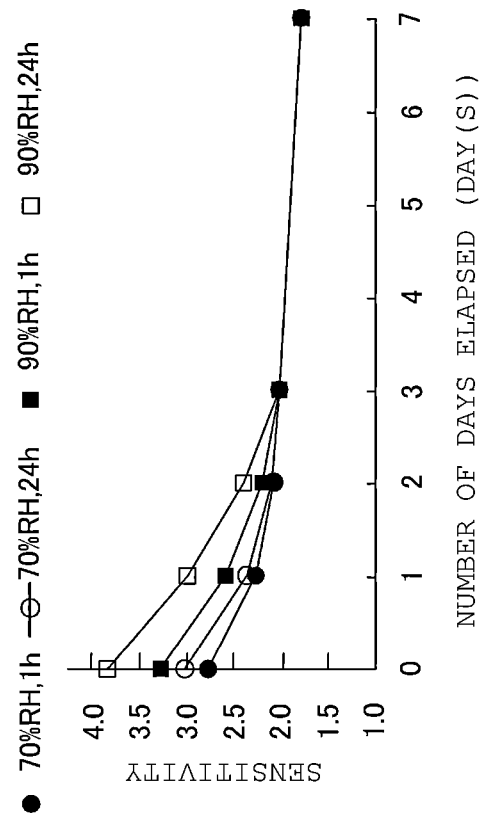

FIG. 4(B) is a graph showing changes in electrostatic capacitance on the moisture absorption treatment day (0 day after moisture absorption treatment), and 1 day, 2 days, 3 days, and 7 days after the moisture absorption treatment when polyoctanium is used as the hygroscopic material 50.

As shown in FIG. 4(B), the hygroscopic material 50 of polyoctanium has a sensitivity of 1 or more under all hygroscopic conditions until three days have elapsed. Therefore, the electrostatic capacitance of the hygroscopic material 50 of hyaluronic acid increases due to moisture absorption.

When polyoctanium is used as the hygroscopic material 50, in the measuring instrument 30, for example, when the threshold is set to sensitivities of 2.3 and 3.3, it is found that on the moisture absorption treatment day, the humidity is maintained in the range of 50 to 70% RH when the sensitivity is in a range of 1.0 to 2.3, the humidity is maintained in the range of 70 to 90% RH when the sensitivity is in a range of 2.3 to 3.3, and the humidity is 90% RH or more when the sensitivity is 3.3 or more. On the other hand, it can be seen that in the hygroscopic material 50 of polyoctanium, when more than three days have passed, the sensitivity gradually approaches 1 from a state absorbing moisture in a low humidity for a short time, and the state returns to a state before moisture absorption.

The hygroscopic material 50 is not only a superabsorbent material, hyaluronic acid, and polyoctanium, but also an organic material known to have a hygroscopic ability, and a similar result is obtained.

Next, an example in which the hygroscopic material 50 is bentonite will be described. As the bentonite, purified bentonite and silanized bentonite (e.g., the end surface of bentonite having a layered structure is silanized to have hydrophobicity in part) are provided.

In the hygroscopic material 50 of the bentonite, in order to bond particles of the bentonite to each other and a raw material paste of the hygroscopic material 50 to the substrate, binders were added in amounts of 3% by weight, 5% by weight, and 10% by weight to the purified bentonite, respectively. In addition, 3% by weight of silanized bentonite was added. The raw material paste is obtained by mixing bentonite and a binder with a solvent (e.g., Ekinen). Similarly to the case of using the superabsorbent material as the hygroscopic material 50, the raw material paste is dried at 130° C. for 10 minutes. The initial state is the same as described above, and is a state of being left standing for 24 hours in a thermo-hygrostat (e.g., SH-641 manufactured by ESPEC CORP.) set at 25° C. and 50% RH.

FIGS. 5(A), 5(B), 5(C), and 5(D) are each graphs showing the changes in electrostatic capacitance on the moisture absorption treatment day (0 day after moisture absorption treatment), and 1 day, 2 days, 3 days, and 7 days after the moisture absorption treatment when purified bentonite to which 3, 5, and 10% by weight of a binder is added and silanized bentonite are used as the hygroscopic material.

Figure 5A:
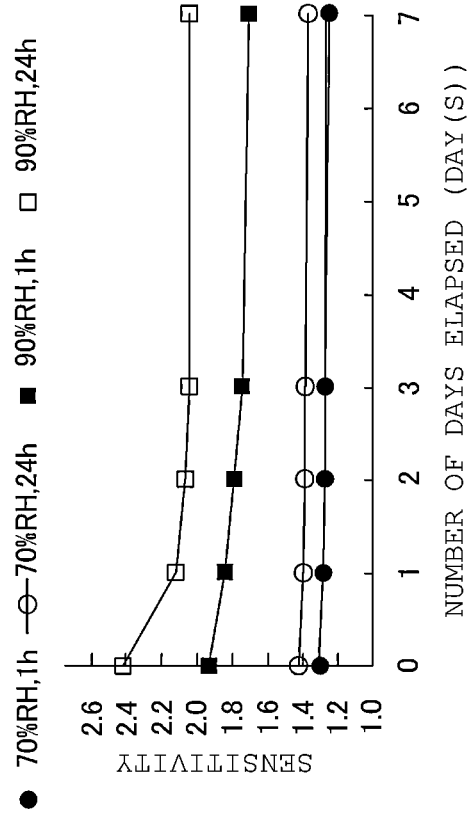
FIGS. 5(A) TO 5(D) are each graphs showing the changes in electrostatic capacitance on the moisture absorption treatment day (0 day after moisture absorption treatment), and 1 day, 2 days, 3 days, and 7 days after the moisture absorption treatment when purified bentonite to which 3, 5, and 10% by weight of a binder is added and silanized bentonite are used as the hygroscopic material 50.
Figure 5B:
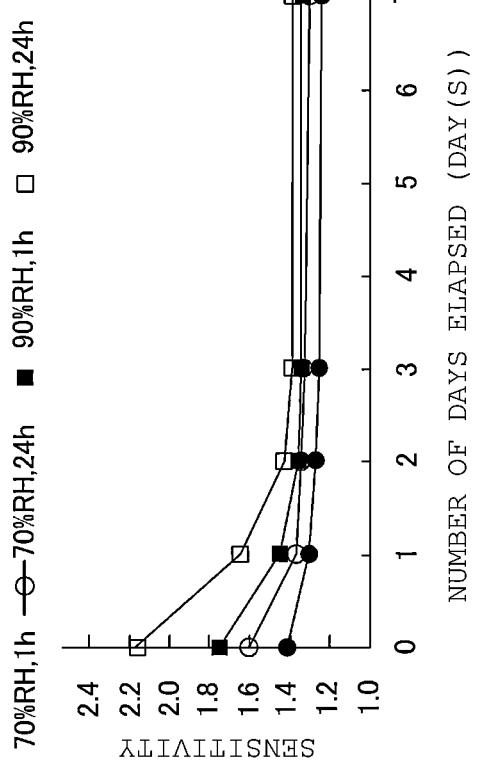
Figure 5C:
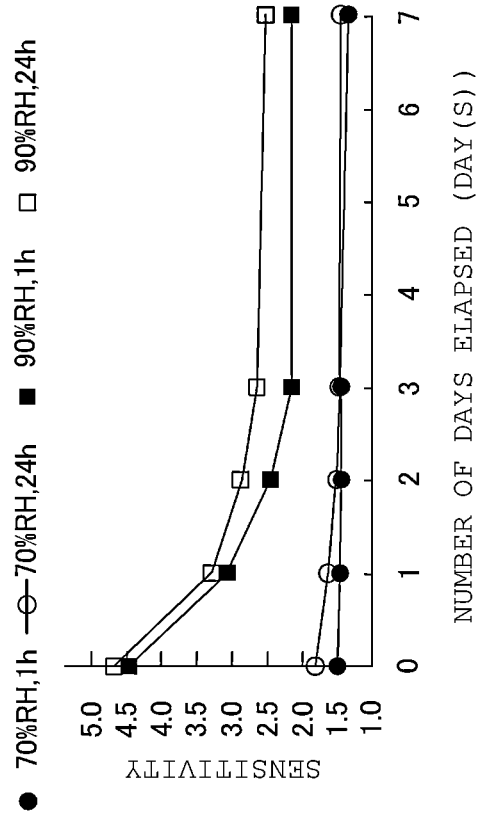
Figure 5D:
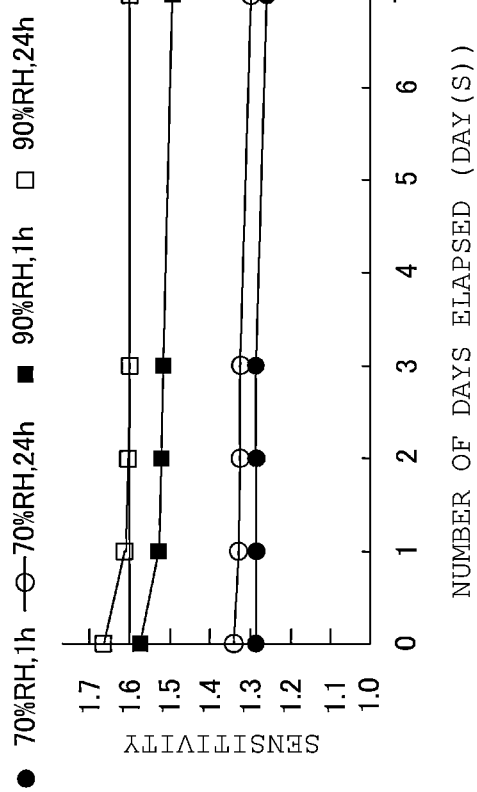

In particular, FIG. 5(A) shows a result of adding 3% by weight of a binder to purified bentonite. FIG. 5(B) shows a result of adding 5% by weight of the binder to purified bentonite. FIG. 5(C) shows a result of adding 10% by weight of the binder to purified bentonite. FIG. 5(D) shows a result of adding 3% by weight of the binder to silanized bentonite.

As shown in FIGS. 5(A) to 5(C), the hygroscopic material 50 of purified bentonite has a sensitivity of 1 or more under all hygroscopic conditions. Therefore, the electrostatic capacitance of the hygroscopic material 50 of purified bentonite increases due to moisture absorption. In addition, the sensitivity is higher when moisture is absorbed at 90% RH than when moisture is absorbed at 70% RH, regardless of whether a moisture absorption time is 1 hour or 24 hours, until at least 7 days later. The hygroscopic material 50 of purified bentonite decreases in sensitivity as the amount of binder increases.

Thus, in the measuring instrument 30, for example, when the threshold in the case of a binder amount of 3% by weight is set to sensitivities of 1.8 and 4.7, the threshold in the case of a binder amount of 5% by weight is set to sensitivities of 1.4 and 2.4, and the threshold in the case of a binder amount of 10% by weight is set to sensitivities of 1.3 and 1.7, it is found that after the passage of at least 7 days, the humidity is maintained at 50 to 70% RH when the sensitivities are in ranges of 1.0 to 1.8, 1.0 to 1.4, and 1.0 to 1.3, respectively, the humidity is maintained in the range of 70 to 90% RH when the sensitivities are in ranges of 1.8 to 4.7, 1.4 to 2.4, and 1.3 to 1.7, respectively, and the humidity is 90% RH or more when the sensitivities are 4.7, 2.4, and 1.7 or more, respectively.

Moreover, as shown in FIG. 5(D), the hygroscopic material 50 of silanized bentonite has a sensitivity of 1 or more under all hygroscopic conditions. Therefore, the electrostatic capacitance of the hygroscopic material 50 of silanized bentonite increases due to moisture absorption. In the measuring instrument 30, for example, when the threshold is set to sensitivities of 1.6 and 2.2, it is found that on the moisture absorption treatment day, the humidity is maintained in the range of 50 to 70% RH when the sensitivity is in a range of 1.0 to 1.6, the humidity is maintained in the range of 70 to 90% RH when the sensitivity is in a range of 1.6 to 2.2, and the humidity is 90% RH or more when the sensitivity is 2.2 or more.

Since the silanized bentonite is hydrophobized in part, water is hardly adsorbed. Thus, the silanized bentonite has low sensitivity, and once adsorbed water is easily desorbed. Therefore, the silanized bentonite has a greater decrease in sensitivity with a lapse of time than the purified bentonite.

Figure 6A:
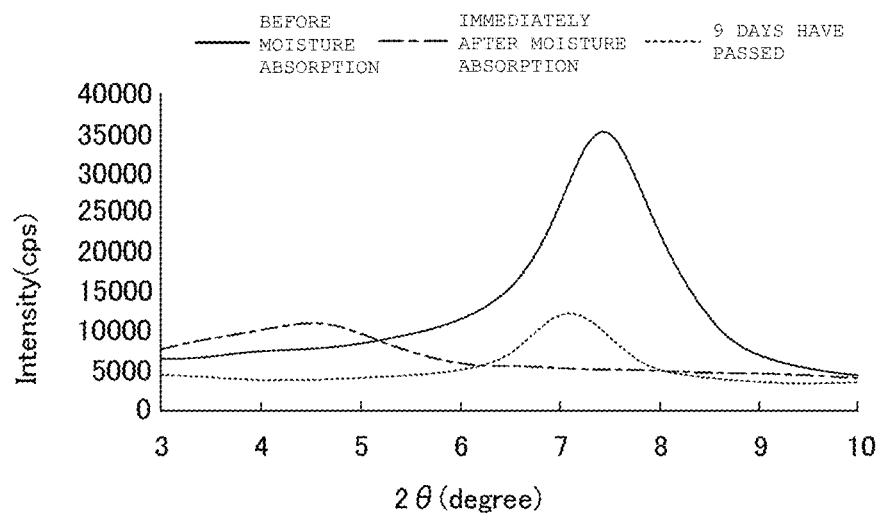
FIGS. 6(A) and 6(B) are each views showing changes in X-ray diffraction (XRD) patterns before and after moisture absorption in the purified bentonite and the silanized bentonite.
Figure 6B:
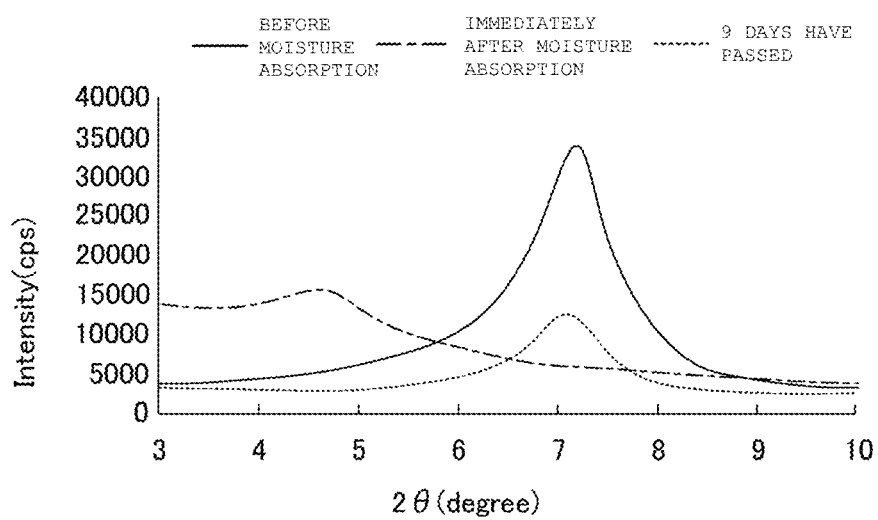

FIGS. 6(A) and 6(B) are views showing changes in an X-ray diffraction (XRD) pattern before and after moisture absorption. For the XRD measurement, Miniflex 600 manufactured by Rigaku Corporation was used. The measurement was performed in a range of 2θ=3° to 10° under conditions of a step of 0.01° and a scan speed of 10°/minute.

Bentonite is a layered compound, and takes up adsorbed water between layers. Therefore, the peak of an X-ray diffraction pattern of bentonite shifts due to moisture absorption. As shown in FIG. 6(A), it is confirmed that a peak position of purified bentonite shifts not only immediately after moisture absorption but also when nine days have passed after moisture absorption. That is, the purified bentonite takes up water between the layers when nine days have passed after moisture absorption.

On the other hand, as shown in FIG. 6(B), in the silanized bentonite, the peak position immediately after moisture absorption shifts (water is taken up between layers). However, as also shown, the peak position almost returns to the peak position before moisture absorption when nine days have passed after moisture absorption. That is, in the silanized bentonite, absorbed moisture is almost desorbed from between the layers when nine days have passed. From these results, it is considered that in the same layered compound, when the hydrophilicity is high, the sensitivity is high, and water can be continuously taken up between the layers after moisture absorption.

The hygroscopic material is not limited to silanized bentonite and purified bentonite, and the same result as this time can be obtained as long as it is a layered compound having a hygroscopic ability.

Next, FIG. 7 is a view showing a relationship between the moisture absorption amount and various conditions. When the hygroscopic material absorbs moisture in the atmosphere, there are an isothermal adsorption curve indicating how much water is adsorbed at each humidity as shown in the left graph of FIG. 7, and a time change curve indicating how much water is adsorbed with a lapse of time at a certain constant humidity as shown in the center graph of FIG. 7. As shown in the right graph of FIG. 7, the electrostatic capacitance can be a generalized parameter as the moisture absorption amount including both these humidities and time.

Figure 8:
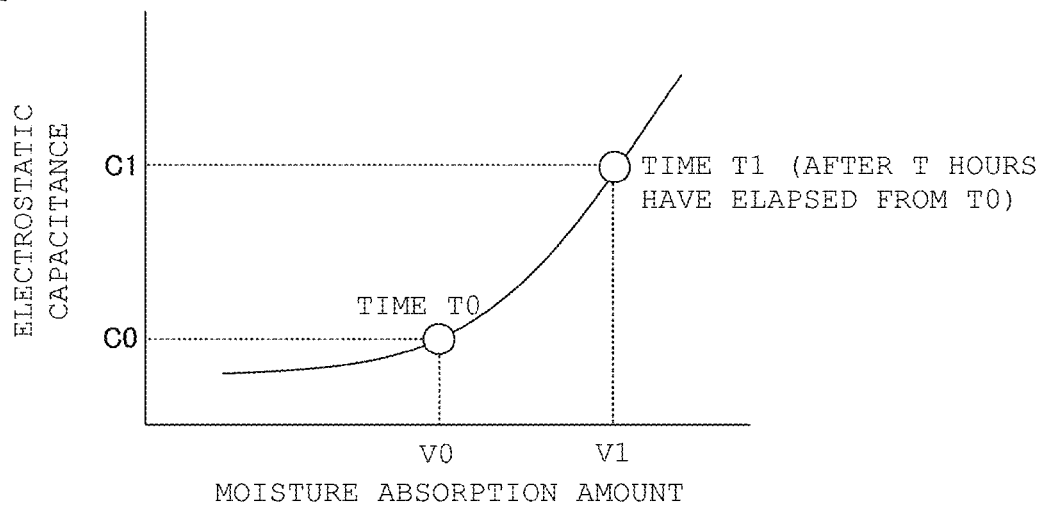
FIG. 8 is a view showing a relationship between the moisture absorption amount and the electrostatic capacitance.

Thus, as shown in FIG. 8, the measuring instrument 30 can estimate the change in the moisture absorption amount (V1−V0) at T time by obtaining a relationship between the moisture absorption amount and the electrostatic capacitance in advance to detect the change in electrostatic capacitance (C1−C0) from a certain arbitrary time T0 to a time T1 after the T time.

As a result, the moisture absorption amount measurement system 1 is configured to obtain the moisture absorption amount from a measurement start time point to a measurement end time point regardless of how a certain measurement object has been stored so far when trying to find out in what environment the measurement object has been stored.

As described above, the sensor unit 13 of the exemplary embodiment is configured to detect humidity by measuring whether or not the humidity has reached a certain level or more only with the hygroscopic material 50, the first electrode 51, the second electrode 52, and the substrate on which these are installed. Unlike a general humidity sensor, the sensor unit 13 of the exemplary embodiment records a history of past humidity changes not in an external memory but in the hygroscopic material. Therefore, the sensor unit 13 can know the history of past humidity changes while being non-powered.

Figure 9A:
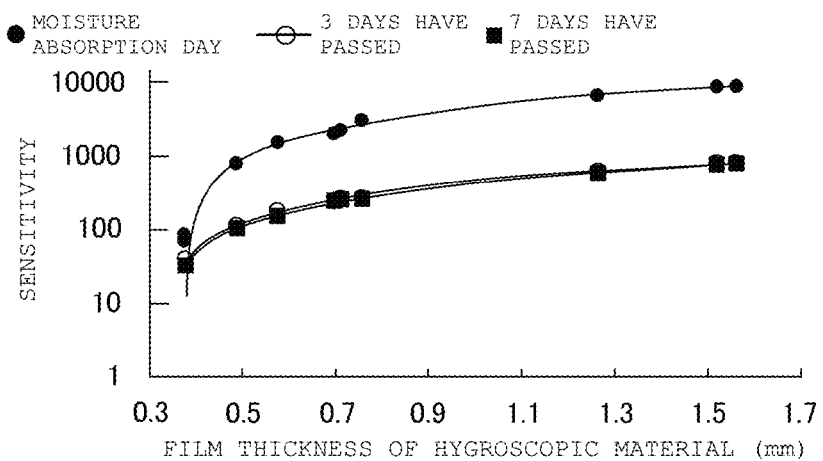
FIGS. 9(A) and 9(B) are views showing a thickness of the hygroscopic material 50 and sensitivity of the sensor unit 13 when the superabsorbent material is used as the hygroscopic material 50.
Figure 9B:
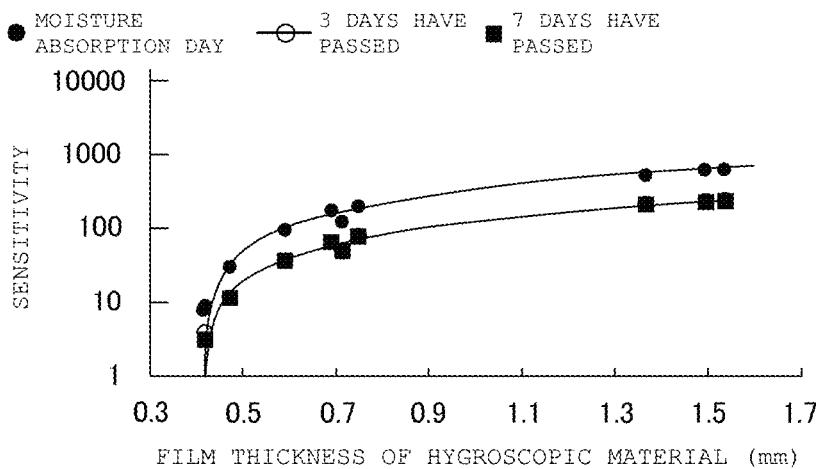

In the sensor unit 13 of the present embodiment, the sensitivity can be easily adjusted by changing the thickness of the hygroscopic material 50. Next, FIGS. 9(A) and 9(B) are views showing a film thickness of the hygroscopic material 50 and the sensitivity of the sensor unit 13 when the superabsorbent material is used as the hygroscopic material 50. FIG. 9(A) is a graph showing a change in sensitivity after moisture absorption at 90% RH for 24 hours, and FIG. 9(B) is a graph showing the change in sensitivity after moisture absorption at 70% RH for 24 hours.

As shown in FIGS. 9(A) and 9(B), the larger the film thickness of the hygroscopic material 50, the higher the sensitivity can be obtained at low humidity. Thus, the threshold of the humidity to be detected can be controlled by changing the film thickness of the hygroscopic material, such as for detecting low humidity when the film thickness of the hygroscopic material 50 is thick and for detecting high humidity when the film thickness is thin.

For example, when the film thickness of the hygroscopic material 50 is 1.5 mm, the sensitivity when moisture is absorbed at 90% RH is about 8752, and the sensitivity when moisture is absorbed at 70% RH is about 635. Both show very high sensitivity. Therefore, when the film thickness of the hygroscopic material 50 is large, measurement can be performed with high sensitivity at low humidity.

On the other hand, when the film thickness of the hygroscopic material 50 is 0.4 mm, the sensitivity when moisture is absorbed at 90% RH is about 86, and the sensitivity when moisture is absorbed at 70% RH is about 8. That is, when the film thickness of the hygroscopic material 50 is thin, the sensitivity is significantly lowered. When the film thickness of the hygroscopic material 50 is thin, the sensor unit 13 responds only to high humidity.

Therefore, the sensor unit 13 of the exemplary embodiment can be a sensor that reacts from low humidity to high humidity or a sensor that reacts only at high humidity by adjusting the film thickness of the hygroscopic material. That is, a detectable threshold can be easily controlled by changing the film thickness of the hygroscopic material 50.

Next, an example will be described in which the sensor unit 13 includes a first humidity sensor and a second humidity sensor having different amounts of change in electrical characteristics according to the moisture absorption amount.

Figure 10A:
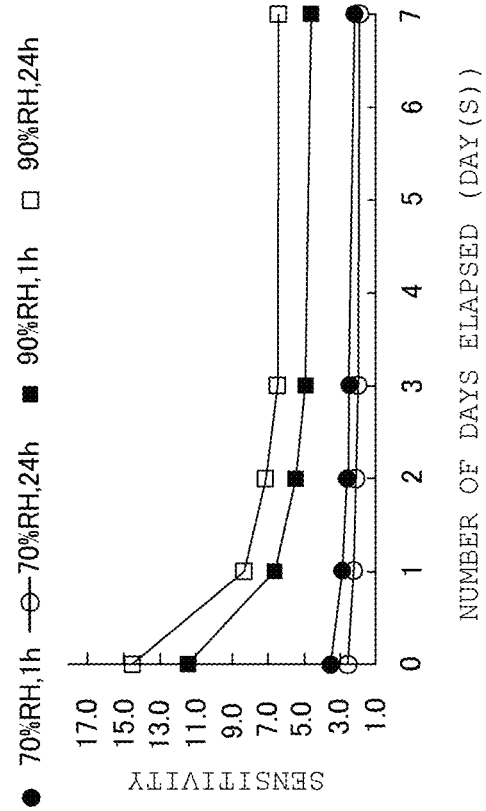
FIGS. 10(A) and 10(B) are views showing a change in sensitivity when the hygroscopic material 50 is formed of a composite material of the superabsorbent material and the purified bentonite.
Figure 10B:
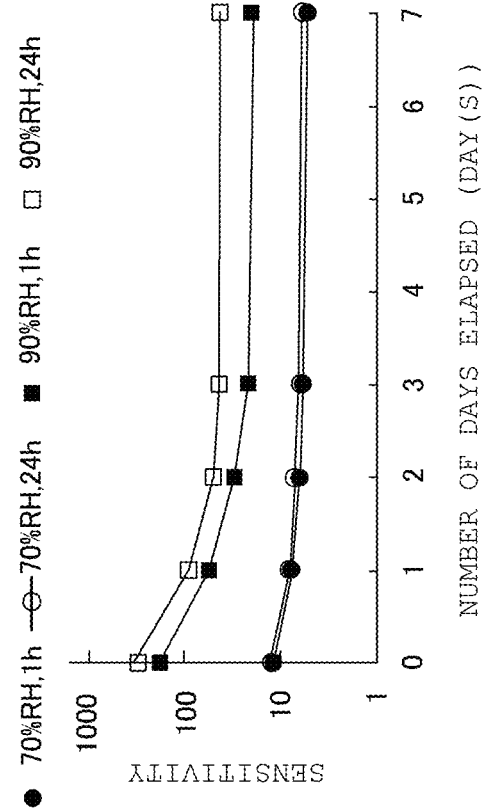

FIGS. 10(A) and 10(B) are views showing the change in sensitivity when the hygroscopic material 50 is formed of a composite material of the superabsorbent material and the purified bentonite. In particular, FIG. 10(A) shows a case where a weight ratio of the superabsorbent material and the purified bentonite is 1:1. Moreover, FIG. 10(B) shows a case where the weight ratio of the superabsorbent material and the purified bentonite is 9:1. It is noted that an addition amount of the binder is 3% by weight in both cases.

As shown in FIG. 3, the superabsorbent material has very high sensitivity, and has a large change in sensitivity with a lapse of time. When moisture is absorbed at 90% RH for 24 hours, a sensitivity decrease when seven days have passed is about 88%. On the other hand, as shown in FIG. 5(A), purified bentonite has a relatively low sensitivity, and has a small change in sensitivity with a lapse of time. When moisture is absorbed at 90% RH for 24 hours, the sensitivity decrease when seven days have passed is about 58%. Therefore, the sensor unit 13 can be configured to control the sensitivity and water retention time by using a material obtained by mixing a material having high sensitivity and short water retention time with a material having low sensitivity and long water retention time.

As shown in FIGS. 10(A) and 10(B), the sensitivity decreases as a proportion of purified bentonite increases, while the decrease in sensitivity with a lapse of time decreases. For example, when the weight ratio of the purified bentonite to the superabsorbent material is 1:1, the change in sensitivity after seven days have elapsed when moisture is absorbed at 90% RH for 24 hours is about 86%, and when the weight ratio is 9:1, the change in sensitivity is about 60%.

Figure 11A:
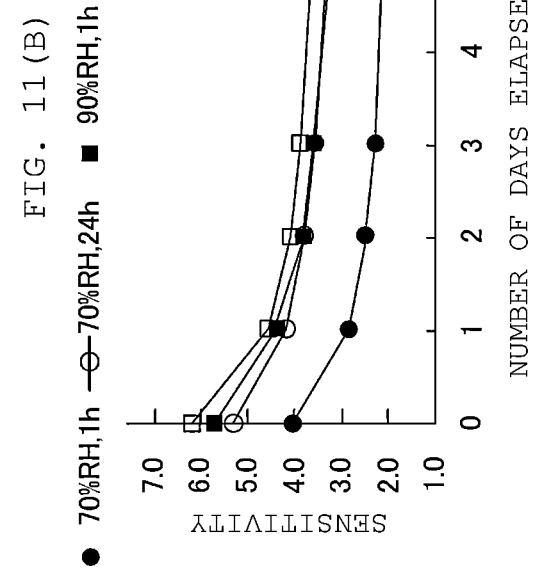
FIGS. 11(A) to 11(D) are views showing the change in sensitivity when the hygroscopic material 50 is formed of a composite material of hyaluronic acid and the purified bentonite.
Figure 11B:
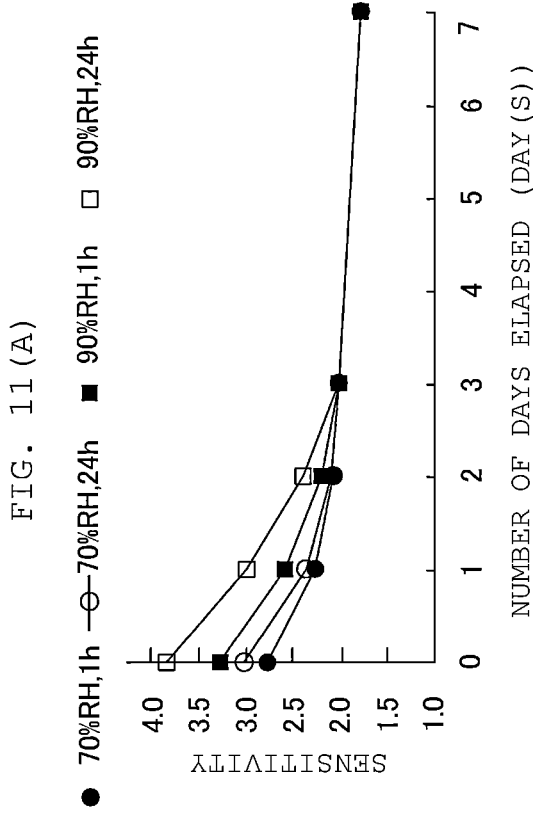
Figure 11C:
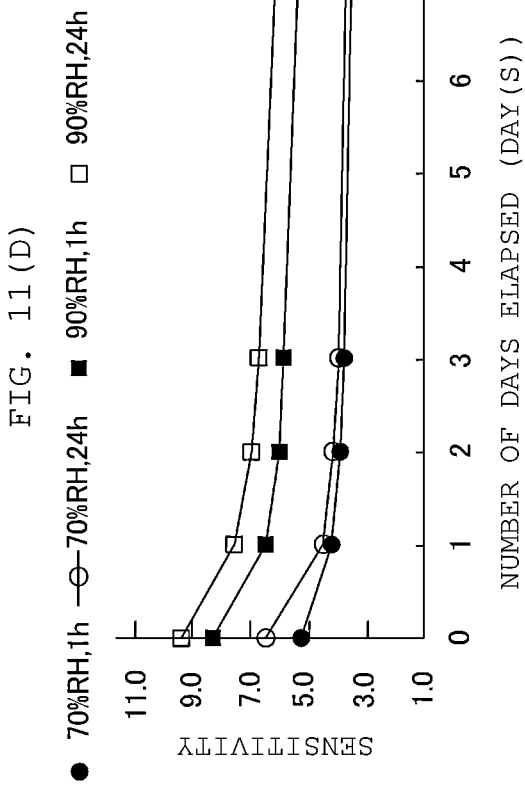
Figure 11D:
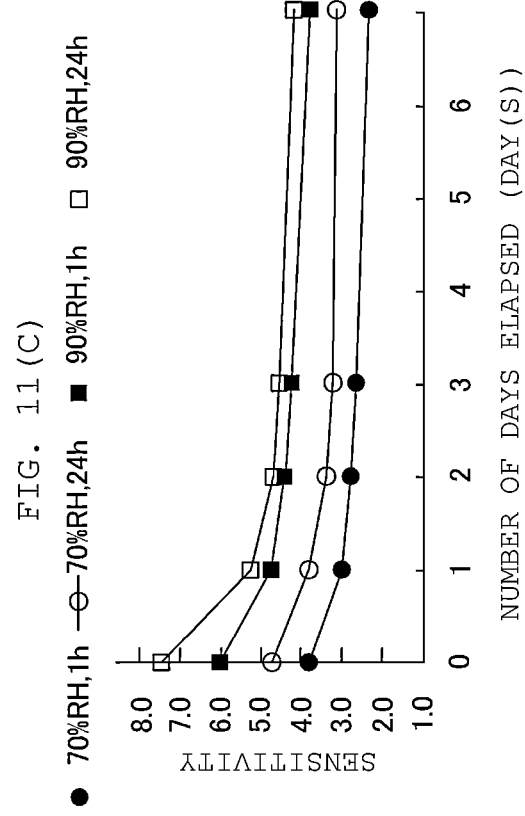

FIGS. 11(A) to 11(D) are views showing the change in sensitivity when the hygroscopic material 50 is formed of a composite material of hyaluronic acid and purified bentonite. In particular, FIG. 11(A) shows a case where a weight ratio of hyaluronic acid and purified bentonite is 10:0, FIG. 11(B) shows a case where the weight ratio of hyaluronic acid and purified bentonite is 8:2, FIG. 11(C) shows a case where the weight ratio of hyaluronic acid and purified bentonite is 5:5. Moreover, FIG. 11(D) shows a case where the weight ratio of hyaluronic acid and purified bentonite is 2:8.

From these results, the sensitivity is improved as the proportion of purified bentonite increases. These results are higher than the sensitivity when 3% by weight of the binder is added to purified bentonite shown in FIG. 5(A).

As described above, hyaluronic acid has hygroscopicity and also functions as a binder. Therefore, the composite material of hyaluronic acid and purified bentonite does not require a binder having low hygroscopicity. Thus, by mixing hyaluronic acid, the sensitivity can be improved without adding a binder.

In addition to hyaluronic acid, polyoctanium also has hygroscopicity and functions as a binder. In addition, any material that has hygroscopicity and also functions as a binder may be used.

Next, an array sensor in which a plurality of the sensor units 13 having different changes in electrical characteristics (that is, sensitivities) with respect to the moisture absorption amount are combined will be described.

The sensor unit 13 described above is configured to detect whether or not it is exposed under a humidity environment of a certain level or more, and cannot detect an exposure timing. For example, the same sensitivity may be shown between a case where measurement is performed immediately after moisture absorption at low humidity and a case where measurement is performed after a lapse of a certain period of time at high humidity. On the other hand, the array sensor can detect the timing of exposure to the humidity environment of a certain level or more.

Figure 12A:
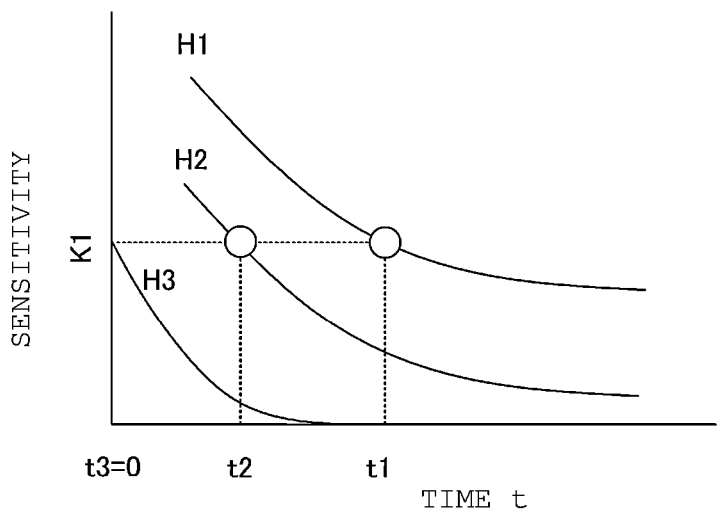
FIGS. 12(A) and 12(B) are views showing the changes in sensitivity with a lapse of time in a plurality of the sensor units 13 constituting an array sensor.
Figure 12B:
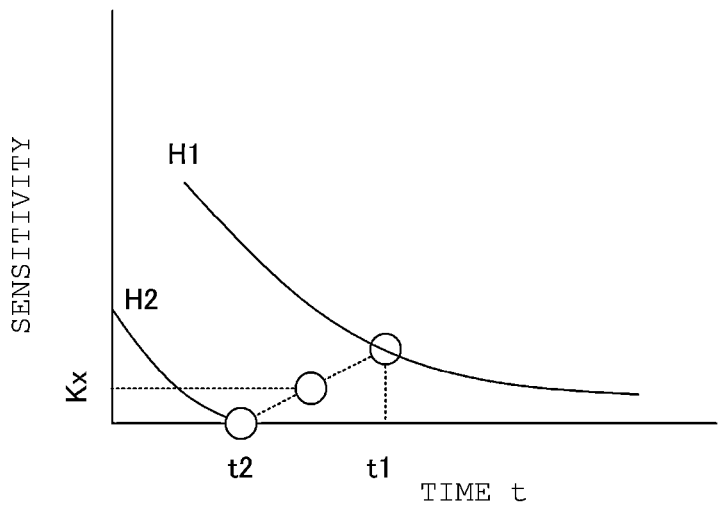

FIGS. 12(A) and 12(B) are views showing the changes in sensitivity with a lapse of time in the plurality of the sensor units 13 constituting the array sensor. The sensor unit 13 having high sensitivity is relatively thick, for example, and the sensor unit 13 having low sensitivity is relatively thin. In addition, the hygroscopic material 50 having high sensitivity such as a superabsorbent material may be used for the high-sensitivity sensor unit 13, and the hygroscopic material 50 having low sensitivity such as hyaluronic acid may be used for the low-sensitivity sensor unit 13.

FIG. 12(A) shows the change in sensitivity of the high-sensitivity sensor unit 13, and FIG. 12(B) shows the change in sensitivity of the low-sensitivity sensor unit 13. The time $t=t3=0$ indicates a time immediately after moisture absorption. H1, H2, and H3 each correspond to humidity, and the humidity of H1 is the highest and is 100% RH.

As shown in FIG. 12(A), only with the sensor unit 13 having one type of sensitivity, for example, in a case where sensitivity K1 is indicated, it is impossible to distinguish between a case immediately after moisture is absorbed in H3 of low humidity, a case where time t1 elapses after moisture is absorbed in H1 of high humidity, and a case where time t2 elapses after moisture is absorbed in H2 of medium humidity. Thus, only with the sensor unit 13 having one type of sensitivity, it is possible to detect whether or not it is exposed under the humidity environment of a certain level or more, and the exposure timing cannot be detected.

On the other hand, in the array sensor, by using the sensor unit 13 having different sensitivities, it is possible to detect the timing of exposure under the humidity environment of a certain level or more. The low-sensitivity sensor unit 13 shown in FIG. 12(B) has a sensitivity of 1.0 or less after the time t2 elapses under the environment of the humidity H2, and does not exhibit a response. Under the environment of the humidity H3, no response is exhibited immediately after moisture absorption. On the other hand, when the low-sensitivity sensor unit 13 is exposed under the humidity environment higher than the humidity H2, the sensitivity shows a value larger than 1 until a certain time after the time t2 has elapsed. For example, in the example of FIG. 12(B), the sensor unit 13 indicates sensitivity Kx. That is, in the array sensor, in a case where both the high-sensitivity sensor unit 13 and the low-sensitivity sensor unit 13 exhibit a response, exposure under the humidity environment of the humidity H2 or more can be detected, the sensitivity K1 is shown in a high-sensitivity sensor, and the sensitivity Kx is shown in a low-sensitivity sensor. In the array sensor, by obtaining in advance a relationship (curves of H1 and H2 shown in the figures) between the humidity and an elapsed time after moisture absorption with respect to the sensitivity in each of the high-sensitivity sensor unit 13 and the low-sensitivity sensor unit 13, it is possible to detect both the humidity and the elapsed time from a combination of the sensitivity K1 of the high-sensitivity sensor unit 13 and the sensitivity Kx of the low-sensitivity sensor unit 13 actually measured.

In the example of FIG. 12(B), a humidity range that can be measured including the elapsed time after moisture absorption is in a range of H2 to H1. In a case where it is desired to measure a lower humidity range, the sensor unit 13 having higher sensitivity may be used as a low-sensitivity sensor.

In this example, the first moisture absorbing sensor and the second moisture absorbing sensor having different sensitivities are used. However, in the present invention, humidity detection including a lapse of time may be performed with higher accuracy using a larger number of moisture absorbing sensors.

In the above example, the change in electrostatic capacitance has been described as sensitivity. In actual use, the measuring instrument 30 does not need to measure the electrostatic capacitance value, and may read an impedance change as described below.

Figure 13:
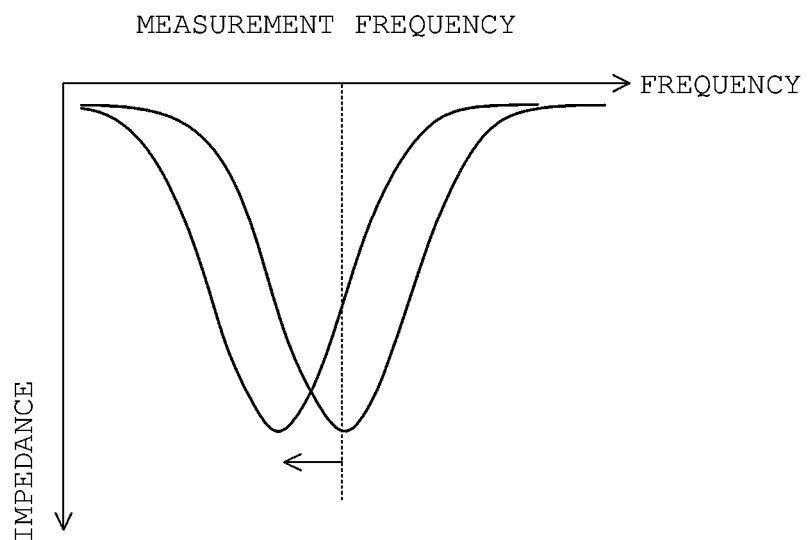
FIG. 13 is a view for explaining a humidity detection principle.

FIG. 13 is a view for explaining a humidity detection principle. A resonance frequency f of an equivalent circuit of the sensor unit 13 and the antenna 12 shown in FIG. 1(A) is expressed by $f=1/(2\pi\sqrt{(LC)})$ where L is an inductance component and C is a capacitance component. The impedance has a maximum value at the resonance frequency f. Here, as shown in FIG. 13, when the hygroscopic material 50 absorbs moisture and the capacitance component C changes, the resonance frequency f also changes, and the impedance also changes. The IC 11 reads the change in impedance and transmits the impedance change to the measuring instrument 30. If a relationship between the impedance and the hygroscopic condition is measured in advance, the measuring instrument 30 can detect whether or not it is exposed under the humidity environment exceeding a threshold.

The sensitivity change of the hygroscopic material shown in the present embodiment is shown in Table 1 below. It is noted that the change (%) shown in Table 1 is 100% when the sensitivity is 1. That is, when returning to the state before moisture absorption, the change is 100%. For example, since the superabsorbent material has a sensitivity of 2249 immediately after moisture absorption and a sensitivity of 265.3 when 7 days have passed after moisture absorption, the change is $(2249.0-265.3)/(2249.0-1.0) \times 100 \approx 88.3(\%)$.

TABLE 1

| Hygroscopic material | Sensitivity on moisture absorption treatment day | Sensitivity when 7 days have passed after moisture absorption day | Change from moisture absorption treatment day to 7 days later after moisture absorption (%) |
|---|---|---|---|
| Superabsorbent material | 2249.0 | 265.3 | 88.3 |
| Hyaluronic acid | 3.9 | 1.8 | 71.2 |
| Polyoctanium | 3.3 | 1.2 | 92.2 |
| Purified bentonite (binder 3 wt %) | 4.7 | 2.5 | 58.4 |
| Purified bentonite (binder 5 wt %) | 2.4 | 2.0 | 26.2 |
| Purified bentonite (binder 10 wt %) | 1.7 | 1.6 | 9.1 |
| Silanized bentonite | 2.2 | 1.4 | 67.2 |
| Purified bentonite: superabsorbent material = 1:1 | 300.9 | 42.4 | 86.2 |
| Purified bentonite: superabsorbent material = 9:1 | 14.6 | 6.4 | 60.0 |
| Hyaluronic acid:purified bentonite = 10:0 | 3.9 | 1.8 | 71.2 |
| Hyaluronic acid:purified bentonite = 8:2 | 6.2 | 3.4 | 54.1 |
| Hyaluronic acid:purified bentonite = 5:5 | 7.5 | 4.2 | 50.8 |
| Hyaluronic acid:purified bentonite = 2:8 | 9.4 | 6.2 | 38.6 |

As shown in Table 1, a change in the electrical characteristics after 7 days have elapsed at a temperature of 25° C. and a humidity of 50% after a state of absorbing moisture for 24 hours at a temperature of 25° C. and a humidity of 90% is 92% or less for a material having the largest change. Therefore, any of the materials shown in the present embodiment is a hygroscopic material that maintains a hygroscopic state for a predetermined time or more after moisture absorption. In this embodiment, the example in which the electrical characteristics return by 92% with the material having the largest change has been described. However, maintaining the hygroscopic state means that the state does not return to the state before moisture absorption (i.e., the change does not become 100%).

In general, it is noted that the description of the exemplary embodiment is to be considered in all respects as illustrative and not limiting. Furthermore, the scope of the present invention is intended to encompass all modifications within the spirit and scope equivalent to the exemplary embodiment.

For example, although the RFID tag is illustrated in the present embodiment, the moisture absorbing sensor is not limited to the RFID tag. For example, the measuring instrument 30 and the sensor unit 13 may be connected by wire to measure the electrical characteristics such as electrostatic capacitance. In the present invention, a change in electric resistance or a change in inductance may be measured instead of the change in electrostatic capacitance due to moisture absorption.

DESCRIPTION OF REFERENCE SYMBOLS

1: Moisture absorption amount measurement system
10: RFID tag
11: IC
12: Antenna
13: Sensor unit 30: Measuring instrument
50: Hygroscopic material
51: First electrode
52: Second electrode

The invention claimed is:

1. A moisture absorbing sensor comprising:
a hygroscopic material configured to maintain a shape before and after moisture absorption and to further maintain a hygroscopic state for at least a predetermined time after the moisture absorption; and
an electrode disposed in the hygroscopic material,
wherein a circuit formed by the electrode and the hygroscopic material comprises an electrical characteristic that is configured to change according to an amount of the moisture absorption by the hygroscopic material, and
wherein the hygroscopic material is configured to hold the hygroscopic state after 7 days have elapsed at a temperature of 25° C. and a humidity of 50% after a state of absorbing moisture for 24 hours at a temperature of 25° C. and a humidity of 90%.

2. The moisture absorbing sensor according to claim 1, wherein, in the hygroscopic material, the electrical characteristic is configured to change by an amount based on a change in film thickness.

3. The moisture absorbing sensor according to claim 1, wherein the hygroscopic material comprises a plurality of materials having different hygroscopic abilities.

4. The moisture absorbing sensor according to claim 3, wherein the hygroscopic material comprises a material having a binder function.

5. The moisture absorbing sensor according to claim 1, wherein the electrical characteristic comprises electrostatic capacitance.

6. The moisture absorbing sensor according to claim 1, further comprising a first humidity sensor and a second humidity sensor that each are configured to change by a different amount in the electrical characteristic with respect to moisture absorption.

7. A moisture absorbing sensor comprising:
a first humidity sensor;
a second humidity sensor; and
a hygroscopic material configured to maintain a shape before and after a moisture absorption and to further maintain a hygroscopic state for at least a predetermined time after the moisture absorption,
wherein the first and second humidity sensors are each configured to change by different amounts in an electrical characteristic in response to the moisture absorption, and
wherein the hygroscopic material is configured to hold the hygroscopic state after 7 days have elapsed at a temperature of 25° C. and a humidity of 50% after a state of absorbing moisture for 24 hours at a temperature of 25° C. and a humidity of 90%.

8. The moisture absorbing sensor according to claim 7, further comprising:
an electrode disposed in the hygroscopic material.

9. An RFID tag comprising:
the moisture absorbing sensor according to claim 1;
an antenna; and
an IC that communicates via the antenna.

10. The RFID tag according to claim 9, wherein the electrical characteristic comprises electrostatic capacitance.

11. The RFID tag according to claim 9, further comprising a first humidity sensor and a second humidity sensor that each are configured to change by a different amount in the electrical characteristic with respect to moisture absorption.

12. A moisture absorption amount measurement system comprising:
a moisture absorbing sensor including a hygroscopic material configured to maintain a shape before and after a moisture absorption and to maintain a hygroscopic state for at least a predetermined time after the moisture absorption, and an electrode disposed in the hygroscopic material; and
a measuring instrument configured to measure an electrical characteristic of a circuit that includes the electrode and the hygroscopic material,
wherein the measuring instrument is configured to estimate an amount of the moisture absorption of the hygroscopic material based on a first electrical characteristic at a first time and a second electrical characteristic at a second time, and
wherein the hygroscopic material is configured to hold the hygroscopic state after 7 days have elapsed at a temperature of 25° C. and a humidity of 50% after a state of absorbing moisture for 24 hours at a temperature of 25° C. and a humidity of 90%.

13. The moisture absorption amount measurement system according to claim 12, wherein the electrical characteristic of the circuit formed by the electrode and the hygroscopic material changes according to the amount of the moisture absorption by the hygroscopic material.

14. The moisture absorption amount measurement system according to claim 12, wherein, in the hygroscopic material, the electrical characteristic is configured to change by an amount based on a change in film thickness.

15. The moisture absorption amount measurement system according to claim 12, wherein the hygroscopic material comprises a plurality of materials having different hygroscopic abilities.

16. The moisture absorption amount measurement system according to claim 15, wherein the hygroscopic material comprises a material having a binder function.

17. The moisture absorption amount measurement system according to claim 12, wherein the electrical characteristic comprises electrostatic capacitance.

* * * * *